US009134553B2

(12) United States Patent
Lim et al.

(10) Patent No.: US 9,134,553 B2
(45) Date of Patent: Sep. 15, 2015

(54) OPTICAL MODULATOR AND METHOD FOR MANUFACTURING THE SAME

(75) Inventors: Eu-Jin Andy Lim, Singapore (SG); Kah Wee Ang, Singapore (SG); Qing Fang, Singapore (SG); Tsung-Yang Jason Liow, Singapore (SG); Mingbin Yu, Singapore (SG); Guo Qiang Patrick Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 371 days.

(21) Appl. No.: 13/634,364

(22) PCT Filed: Mar. 10, 2011

(86) PCT No.: PCT/SG2011/000097
§ 371 (c)(1),
(2), (4) Date: Nov. 26, 2012

(87) PCT Pub. No.: WO2011/115574
PCT Pub. Date: Sep. 22, 2011

(65) Prior Publication Data
US 2013/0071058 A1    Mar. 21, 2013

(30) Foreign Application Priority Data
Mar. 15, 2010    (SG) .............................. 201001780-4

(51) Int. Cl.
*G02F 1/035*    (2006.01)
*G02F 1/03*    (2006.01)
(Continued)

(52) U.S. Cl.
CPC ........ *G02F 1/025* (2013.01); *G02F 2001/0157* (2013.01); *G02F 2201/063* (2013.01)

(58) Field of Classification Search
None
See application file for complete search history.

(56) References Cited

U.S. PATENT DOCUMENTS

| 6,298,177 B1 | 10/2001 | House |
| 7,599,593 B2 | 10/2009 | Harris, Jr. et al. |

(Continued)

FOREIGN PATENT DOCUMENTS

| GB | 2379994 | 3/2003 |
| JP | 2004258119 | 9/2004 |

(Continued)

OTHER PUBLICATIONS

Kuo, et al., High Speed Hybrid Silicon Evanescent Electroabsorption Modulator, 16 Optics Express, 9936 (2008).

(Continued)

*Primary Examiner* — Hemang Sanghavi
(74) *Attorney, Agent, or Firm* — K. David Crockett, Esq.; Niky Economy Syrengelas, Esq.; Crockett & Crockett, PC

(57) ABSTRACT

An optical modulator and a method for manufacturing an optical modulator are provided. The optical modulator includes a first waveguide, a second waveguide, a modulating portion connected between the first waveguide and the second waveguide, the modulating portion being configured to receive an input signal from the first waveguide, to modulate the input signal and to supply a corresponding modulated input signal as an output signal to the second waveguide, wherein the modulating portion includes a semiconductor substrate, one end thereof being coupled to the first waveguide, and a corresponding opposite end thereof being coupled to the second waveguide, a Germanium rib provided on the substrate such that the input signal propagates through the Germanium rib along a longitudinal axis thereof, and a first electrode and a second electrode respectively provided on the substrate, wherein the Germanium rib is provided between the first electrode and the second electrode, and wherein the first electrode and the second electrode are configured to apply an electrical field to the Germanium rib in order to modulate the input signal propagating through the Germanium rib.

20 Claims, 14 Drawing Sheets

(51) Int. Cl.
  *G02F 1/025* (2006.01)
  *G02F 1/015* (2006.01)

(56) References Cited

U.S. PATENT DOCUMENTS

| | | | | |
|---|---|---|---|---|
| 2007/0116398 | A1* | 5/2007 | Pan et al. | 385/2 |
| 2010/0330727 | A1* | 12/2010 | Hill et al. | 438/69 |
| 2011/0012090 | A1* | 1/2011 | Singh et al. | 257/24 |
| 2012/0207424 | A1* | 8/2012 | Zheng et al. | 385/2 |

FOREIGN PATENT DOCUMENTS

| WO | WO2007065447 | 6/2007 |
|---|---|---|
| WO | WO2009058470 | 5/2009 |

OTHER PUBLICATIONS

Liao, et al., High Speed Silicon Mach Zehnder Modulator, 13 Optics Express 3129 (2005).
Liu, et al., High-Speed Optical Modulation Based on Carrier Depletion in a Silicon Waveguide, 15 Optics Express 660 (2007).
Marris-Morini, et al., Low Loss and High Speed Silicon Optical Modulator Based on a Lateral Carrier Depletion Structure, 16 Optics Express, 334 (2008).
Xu, et al., 12.5 Gbit/s Carrier-Injection-Based Silicon Micro-Ring Silicon Modulators, 15 Optics Express, 430 (2007).
Cressler, SiGe HBT Technology: A New Contender for Si-Based RF and Microwave Circuit Applications, 46 IEEE Transactions for Microwave Theory Technology, 572 (1998).
Kuo, et al., Strong Quantum-Confined Stark Effect in Germanium Quantum Well Structures on Silicon, 437 Nature, 1334 (2005).
Roth, et al,, Optical Modulator on Silicon Employing Germanium Quantum Wells, 15 Optics Express, 5851 (2007).
Liu, et al,, Waveguide-Integrated, Ultralow-Energy GeSi Electroabsorption Modulators, 2 Nature Photonics, 433 (2008).
Ang, et al,, Novel Silicon—Carbon (Si:C) Schottky Barrier Enhancement Layer for Dark-Current Suppression in Ge-on-SOI MSM Photodetectors, 29 Electron Device Letters, 704 (2008).
Ang, et al,, Novel NiGe MSM Photodetector Featuring Asymmetrical Schottky Barriers Using Sulfur Co-Implantation and Segregation, 29 Electron Device Letters, 708 (2008).
Vivien, et al., 42 GHz Pin Germanium Photodetector Integrated in a Silicon-on-Insulator Waveguide, 17 Optics Express 6252 (2009).
Rouviere, et al., Integration of Germanium Waveguide Photodetectors for Intrachip Optical Interconnects, 44(7) Optical Engineering, 075402 (2005).
Loh, et al., Impact of Local Strain from Selective Epitaxial Germanium with Thin Si/SiGe Buffer on High-Performance p-i-n. Photodetectors with a Low Thermal Budget, 28 Electron Device Letters, 984 (2007).
Shen, et al., Generalized Franz-Keldysh Theory of Electromodulation, 42 Physical Review B, 7097 (1990).
Lim, et al., Design and Fabrication of a Novel Evanescent Germanium Electro-Absorption (EA) Modulator, 7719 Proceedings of SPIE, 77191 (2010).

* cited by examiner

OPTICAL MODULATOR AND METHOD FOR MANUFACTURING THE SAME

TECHNICAL FIELD

Various embodiments relate generally to an optical modulator and a method for manufacturing an optical modulator.

BACKGROUND

The development of a high performance optical modulator is essential for silicon photonics integrated circuits. A possible approach is the hybrid integration of conventional III-V semiconductor or lithium niobate modulators onto a silicon platform. However, this approach does not leverage on the existing complementary metal-oxide-semiconductor (CMOS) process technology to enable low costs and high volume manufacturability of electronic-photonic integrated circuits.

A silicon-based modulator may be more attractive as it may allow the monolithic integration of photonic components with silicon CMOS on a single chip. Silicon-based modulators which use the free carrier plasma dispersion effect for modulation have been demonstrated. The silicon Mach-Zehnder interferometer (MZI) modulator is one such example. However, its long phase shifter length may result in high energy consumption and large on-chip area. A silicon microring resonator modulator may eliminate this issue due to its smaller size, but it may be more susceptible to fabrication errors and has a smaller modulation bandwidth.

SUMMARY

According to one embodiment, an optical modulator is provided. The optical modulator includes a first waveguide, a second waveguide, a modulating portion connected between the first waveguide and the second waveguide, the modulating portion being configured to receive an input signal from the first waveguide, to modulate the input signal and to supply a corresponding modulated input signal as an output signal to the second waveguide, wherein the modulating portion includes a semiconductor substrate, one end thereof being coupled to the first waveguide, and a corresponding opposite end thereof being coupled to the second waveguide, a Germanium rib provided on the substrate such that the input signal propagates through the Germanium rib along a longitudinal axis thereof, and a first electrode and a second electrode respectively provided on the substrate, wherein the Germanium rib is provided between the first electrode and the second electrode, and wherein the first electrode and the second electrode are configured to apply an electrical field to the Germanium rib in order to modulate the input signal propagating through the Germanium rib.

According to another embodiment, a method for manufacturing an optical modulator is provided. The method includes depositing a germanium layer above a semiconductor substrate; and etching the deposited germanium layer to form a Germanium rib having a first sidewall and a second sidewall.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Embodiments of an optical modulator and a method for manufacturing an optical modulator will be described in detail below with reference to the accompanying figures. It will be appreciated that the embodiments described below can be modified in various aspects without changing the essence of the invention.

Figure 1A:
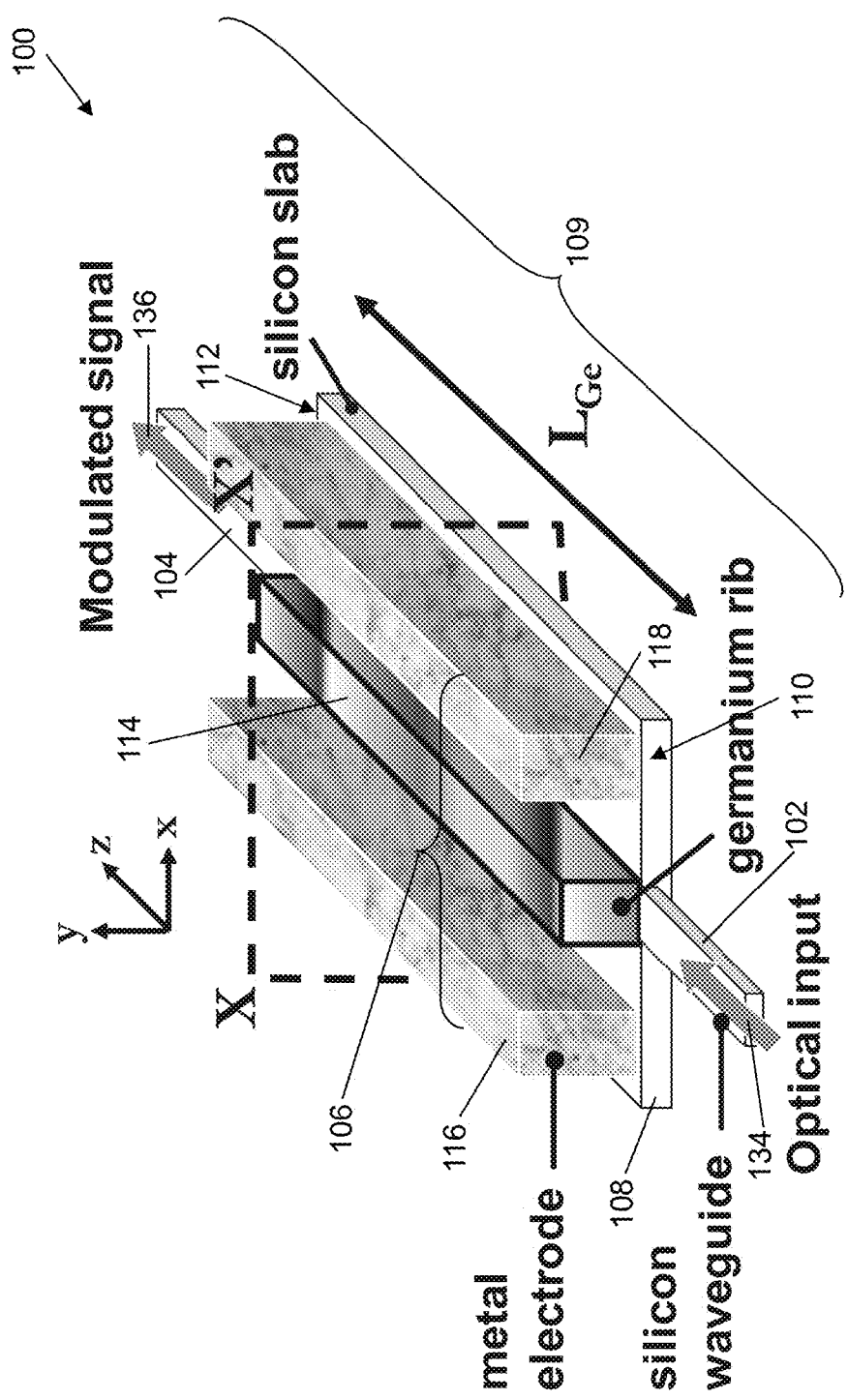
FIG. 1a shows a schematic three-dimensional view of an optical modulator according to one embodiment of the present invention.
Figure 1B:
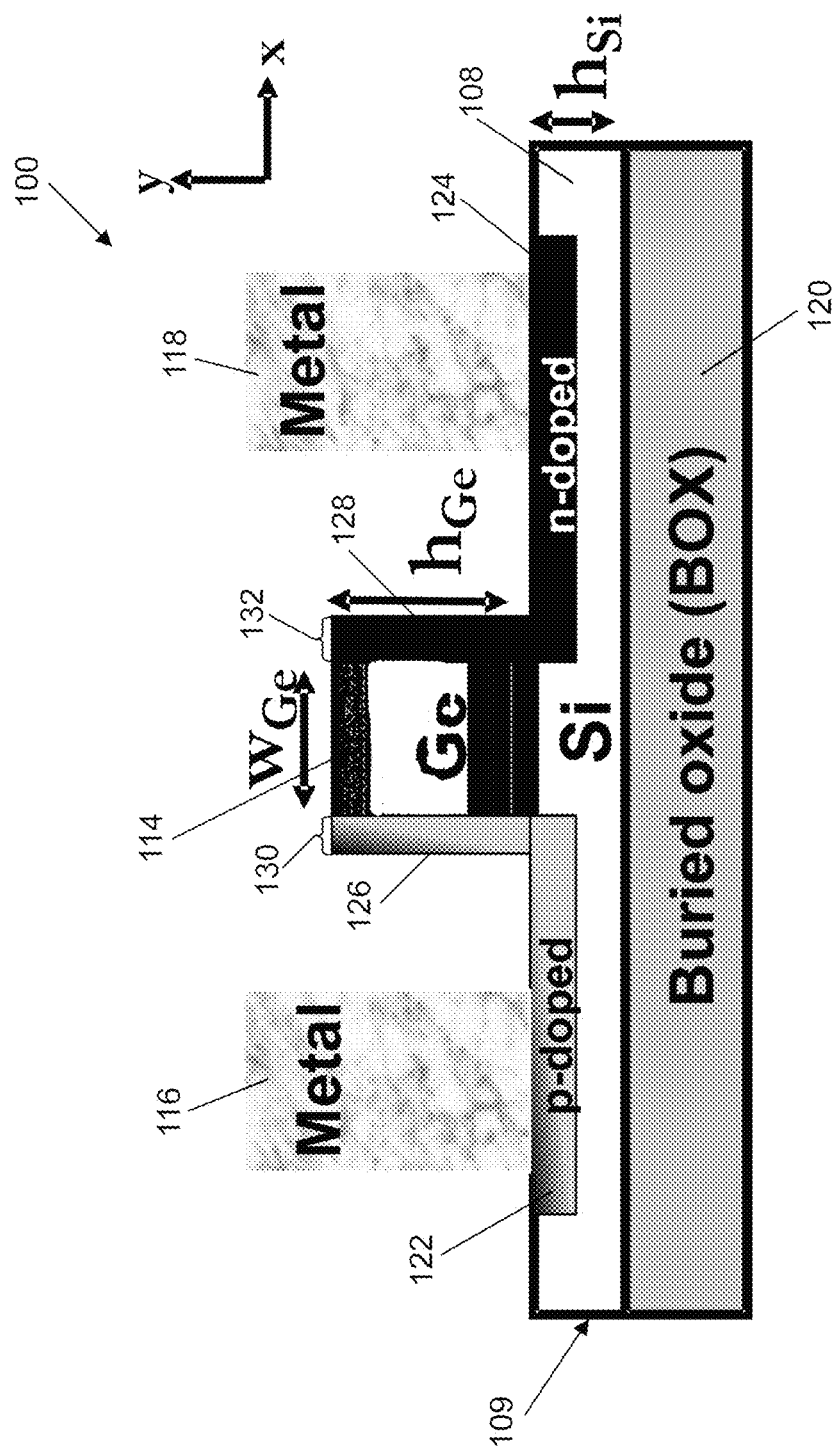
FIG. 1b shows a schematic cross-sectional view of an optical modulator according to one embodiment of the present invention.

FIG. 1a shows a schematic three-dimensional view of an optical modulator 100. FIG. 1b shows a schematic cross-sectional view of an optical modulator 100 along X-X' line.

The optical modulator 100 includes a first waveguide 102 and a second waveguide 104. The optical modulator 100 also includes a modulating portion 106 connected between the first waveguide 102 and the second waveguide 104.

The modulating portion 106 includes a semiconductor substrate 108. One end 110 of the semiconductor substrate 108 is coupled to the first waveguide 102, and a corresponding opposite end 112 of the semiconductor substrate 108 is coupled to the second waveguide 104. In one embodiment, the first waveguide 102, the second waveguide 104 and the semiconductor substrate 108 may be formed monolithically from a same substrate 109. Various materials may be used for the substrate 109. In one embodiment, the substrate 109 may include silicon. Thus, the first waveguide 102, the second waveguide 104 and the semiconductor substrate 108 may include silicon.

The modulating portion 106 also includes a Germanium rib 114. The Germanium rib 114 is provided on the semiconductor substrate 108. The Germanium rib 114 may have a length of $L_{Ge}$.

Germanium is used for the rib 114 for optical modulation, given its process compatibility with silicon in certain integrated circuits. Previously, electro-absorption of light by the quantum-confined Stark effect (QCSE) in Ge/SiGe quantum well and by Frank-Keldysh (FK) effect in bulk Ge were observed. The ability to significantly change the optical absorption in Ge-based materials with an electric field may open the possibility of a Group IV-based electro-absorption modulator for high speed, low power applications.

The modulating portion 106 also includes a first electrode 116 and a second electrode 118. The first electrode 116 and the second electrode 118 are also respectively provided on the semiconductor substrate 108. The Germanium rib 114 is provided between the first electrode 116 and the second electrode 118. Various materials may be used for the first electrode 116 and the second electrode 118. In one embodiment, the first electrode 116 and the second electrode 118 may include aluminum.

Further, referring to Figure 1b, the substrate 109 is disposed above a buried oxide layer 120. In other words, the first waveguide 102, the second waveguide 104 and the semiconductor substrate 108 are disposed above the buried oxide layer 120.

The semiconductor substrate 108 includes a first region 122 doped with atoms of a first conductivity type and a second region 124 doped with atoms of a second conductivity type. The first region 122 is formed below or adjacent to a first sidewall 126 of the Germanium rib 114, and the second region 124 is formed below or adjacent to a second sidewall 128 of the Germanium rib 114. The first electrode 116 is disposed above the first region 122 of the semiconductor substrate 108 and the second electrode 118 is disposed above the second region 124 of the semiconductor substrate 108.

The Germanium rib 114 includes a first region 130 doped with atoms of the first conductivity type and a second region 132 doped with atoms of the second conductivity type. The first region 130 is formed on or within the first sidewall 126 of the Germanium rib 114 and the second region 132 is formed on or within the second sidewall 128 of the Germanium rib 114. The first region 130 of the Germanium rib 114 is disposed above the first region 122 of the semiconductor substrate 108 and the second region 132 of the Germanium rib 114 is disposed above the second region 124 of the semiconductor substrate 108.

In one embodiment, the first conductivity type is a p-conductivity type. The atoms of the first conductivity type may include boron ions. The second conductivity type is an n-conductivity type. The atoms of the second conductivity type may include phosphorous ions.

In another embodiment, the conductivity type of the first region 122 of the semiconductor substrate 108 and the first region 130 of the Germanium rib 114 can be inter-changed with the conductivity type of the second region 124 of the semiconductor substrate 108 and the second region 132 of the Germanium rib 114. That is, the first region 122 of the semiconductor substrate 108 and the first region 130 of the Germanium rib 114 may be doped with atoms of the second conductivity type (e.g. n-conductivity type), and the second region 124 of the semiconductor substrate 108 and the second region 132 of the Germanium rib 114 may be doped with atoms of the first conductivity type (e.g. p-conductivity type).

The first region 122 of the semiconductor substrate 108 and the first region 130 of the Germanium rib 114 are continuously doped with atoms of the first/second conductivity type, and the second region 124 of the semiconductor substrate 108 and the second region 132 of the Germanium rib 114 are continuously doped with atoms of the second/first conductivity type to provide a conduction path for biasing a voltage laterally across the Germanium rib 114. A reverse bias across the Germanium rib 114 can create an electric field and can enhance optical absorption through the Frank-Keldysh effect.

Details of the function of the optical modulator 100 are described in the following.

An input optical signal 134 enters from the first waveguide 102. The optical signal 134 may be coupled from e.g. an optical source (not shown) into the first waveguide 102. The modulating portion 106 receives the optical signal 134 from the first waveguide 102. The first waveguide 102 may include a tapered portion (not shown) being coupled to the one end 110 of the semiconductor substrate 108 to couple the optical signal 134 from the first waveguide 102 into the modulating portion 106. The tapered portion of the first waveguide 102 may provide efficient coupling between the first waveguide 102 and the modulating portion 106 (e.g. the semiconductor substrate 108 of the modulating portion 106).

In one embodiment, the first waveguide 102 may include a further tapered portion (not shown) being coupled to the optical source (not shown). The further tapered portion may provide efficient coupling between the optical source and the first waveguide 102.

At the one end 110 of the semiconductor substrate 108, the optical signal 134 (light) from the first waveguide 134 gets coupled into the Germanium rib 114. In more detail, the optical signal 134 is coupled from the first waveguide 102 into the semiconductor substrate 108 of the modulating portion 106. The optical signal 134 is then coupled from the semiconductor substrate 108 into the Germanium rib 114. The optical signal 134 may be evanescently-coupled (e.g. transmitted from the semiconductor substrate 108 by means of an evanescent, exponentially decaying electromagnetic field) up into the Germanium rib 114 because of a refractive index difference between e.g. between the semiconductor substrate 108 and the Germanium rib 114.

The signal 134 propagates through the Germanium rib 114 along a longitudinal axis (e.g. z-axis) of the optical modulator 100. The modulating portion 106 modulates the signal 134. More specifically, the first electrode 116 and the second electrode 118 of the modulating portion 106 apply an electrical field to the Germanium rib 114 in order to modulate the input signal 134 propagating through the Germanium rib 114. A reverse bias is applied at the first electrode 116 and the second electrode 118. An electric field is thus created across the first sidewall 126 and the second sidewall 128 of the Germanium rib 114 through the e.g. p-doped conduction path (the first region 122 of the semiconductor substrate 108 and the first region 130 of the Germanium rib 114) and the e.g. n-doped conduction path (the second region 124 of the semiconductor substrate 108 and the second region 132 of the Germanium rib 114). The electric field can enhance optical absorption and can modulate the optical signal.

The modulating portion 106 then supplies a corresponding modulated input signal 136 as an output signal to the second waveguide 104. The second waveguide 104 may include a tapered portion (not shown) being coupled to the other end 112 of the semiconductor substrate 108 to couple the modulated optical signal 136 from the modulating portion 106 into the second waveguide 104. The tapered portion of the second waveguide 104 may provide efficient coupling between the second waveguide 104 and the modulating portion 106 (e.g. the semiconductor substrate 108 of the modulating portion 106).

In one embodiment, the second waveguide 104 may include a further tapered portion (not shown). The further tapered portion of the second waveguide 104 may be coupled to e.g. a photodetector. The further tapered portion of the second waveguide 104 may provide efficient coupling between the second waveguide 104 and e.g. the photodetector.

The modulated optical signal 136 gets coupled out at the other end 112 of the semiconductor substrate 108 to the second waveguide 104. In more detail, the modulated optical signal 136 is coupled from the Germanium rib 114 into the semiconductor substrate 108. The modulated optical signal 136 is then coupled from the semiconductor substrate 108 into the second waveguide 104.

Figure 2:
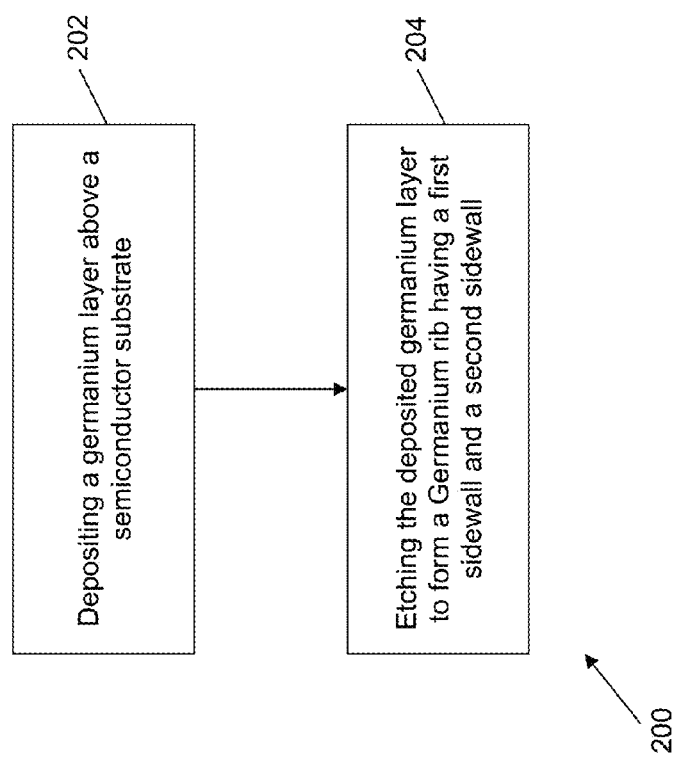
FIG. 2 shows a flowchart of a method for manufacturing an optical modulator according to one embodiment of the present invention.

FIG. 2 shows a flowchart 200 of a method for manufacturing an optical modulator. At 202, a germanium layer is deposited above a semiconductor substrate. The germanium layer may be deposited above the semiconductor substrate by a selective epitaxy process. At 204, the deposited germanium layer is etched to form a Germanium rib having a first sidewall and a second sidewall.

The substrate may be etched to form a first waveguide, a second waveguide and a semiconductor substrate having one end coupled to the first waveguide and a corresponding opposite end coupled to the second waveguide. The substrate may include silicon.

A first region doped with atoms of a first conductivity type and a second region doped with atoms of a second conductivity type may be formed on or within the first and second sidewalls of the Germanium rib, respectively. A first region doped with atoms of the first conductivity type and a second region doped with atoms of the second conductivity type on the semiconductor substrate may be formed before forming the Germanium rib. The formation of the Germanium rib and the formation of the first region and the second region of the semiconductor substrate may be carried out such that the first sidewall of the Germanium rib is disposed above or adjacent to the first region of the semiconductor substrate, and that the second sidewall is disposed above or adjacent to the second region of the semiconductor substrate.

The first conductive type may be a p-conductivity type. The atoms of the first conductivity type may include boron ions. The second conductivity type may be a n-conductivity type. The atoms of the second conductivity type may include phosphorous ions.

Silicon dioxide may be deposited above the semiconductor substrate and the Germanium rib. The deposited silicon dioxide may be etched to expose a portion of the first region of the semiconductor substrate and a portion of the second region of the semiconductor substrate. A conductive material may be deposited in the etched regions of the deposited silicon dioxide to form electrodes. The conductive material may include aluminum.

FIGS. 3a to 3f show an exemplary process for manufacturing an optical modulator 100. FIGS. 3a to 3f show schematic cross-sectional views of an optical modulator 100 along X-X' line of FIG. 1a.

Figures 3A, 3B, 3C, 3D, 3E, 3F:
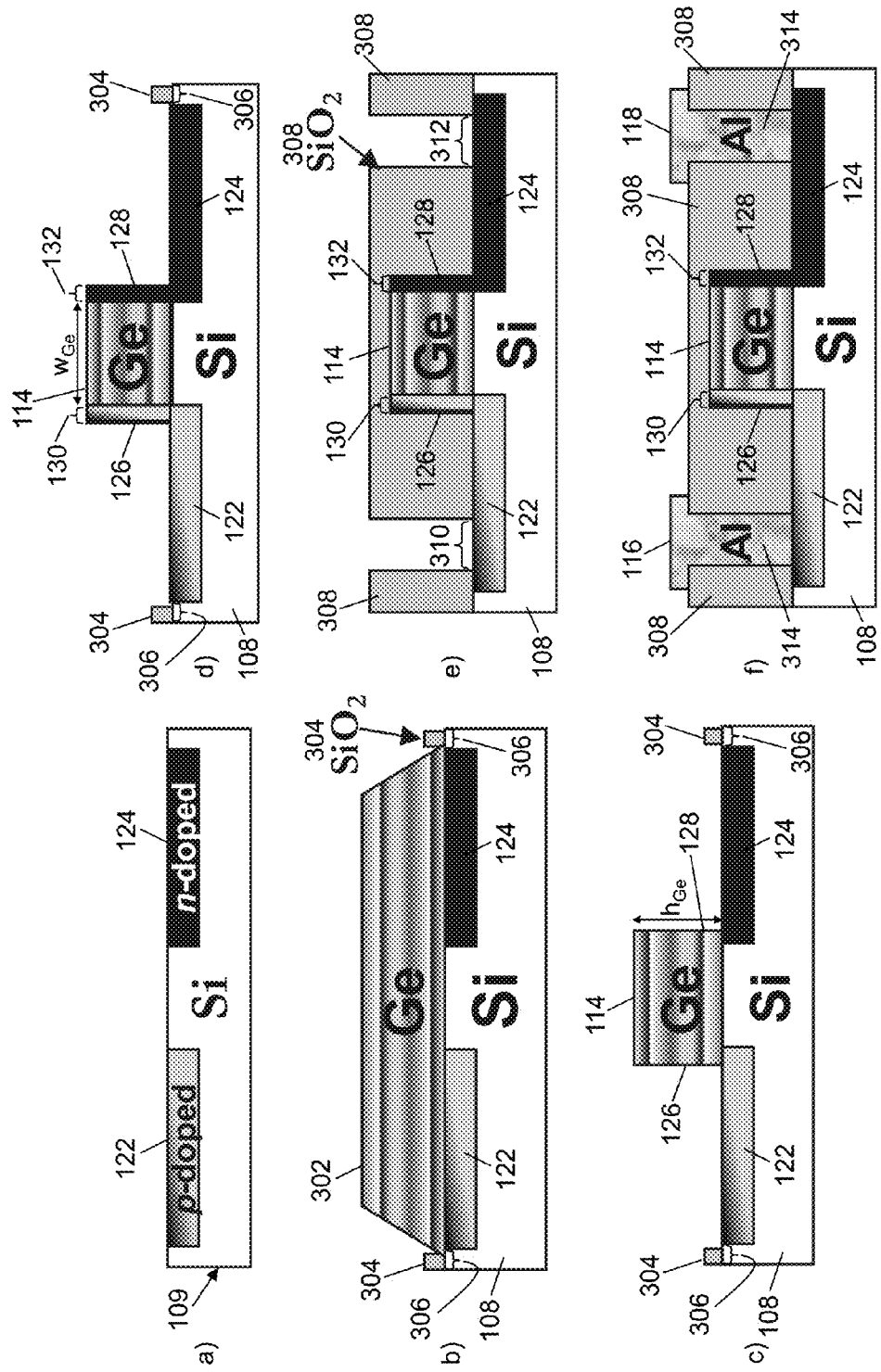
FIGS. 3a to 3f show a process for manufacturing an optical modulator according to one embodiment of the present invention.

FIG. 3a shows a substrate 109 having a first region 122 doped with atoms of a first conductivity type and a second region 124 doped with atoms of a second conductivity type. In one embodiment, the first conductivity type is a p-conductivity type. The atoms of the first conductivity type may include boron ions. The second conductivity type is an n-conductivity type. The atoms of the second conductivity type may include phosphorous ions. The substrate 109 may include silicon. The substrate 109 is etched to form a first waveguide 102, a second waveguide 104 and a semiconductor substrate 108 having one end 110 coupled to the first waveguide 102 and a corresponding opposite end 112 coupled to the second waveguide 104 (as shown in FIG. 1a). In one embodiment, the substrate 109 may have a height of about 220 nm. The first waveguide 102, the second waveguide 104 and the semiconductor substrate 108 may have the same height of about 220 nm.

In one embodiment, each of the first waveguide 102 and the second waveguide 104 may include a tapered portion (not shown). The tapered portion of the first waveguide 102 may be coupled to one end 110 of the semiconductor substrate 108, and the tapered portion of the second waveguide 104 may be coupled to the other end 112 of the semiconductor substrate 108.

In another embodiment, each of the first waveguide 102 and the second waveguide 104 may include a further tapered portion (not shown). The further tapered portion of the first waveguide 102 may be coupled to e.g. an optical source, and the further tapered portion of the second waveguide 104 may be coupled to e.g. a photodetector.

The first waveguide 102 and the second waveguide 104 may have a width of about 500 nm respectively. The width of the tapered portions and the further tapered portions of the first waveguide 102 and the second waveguide 104 may be about 200 nm respectively.

FIG. 3b shows that a germanium layer 302 is deposited above the semiconductor substrate 108. The germanium layer 302 may be deposited above the semiconductor substrate 108 by a selective epitaxy process. The selective epitaxy process may include a low temperature germanium seed at about 400° C. and a higher temperature cyclic growth at about 550° C. Silicon dioxide 304 may be deposited above portions 306 of the semiconductor substrate 108 uncovered by the germanium layer 302.

FIG. 3c shows that the deposited germanium layer 302 is etched to form a Germanium rib 114 having a first sidewall 126 and a second sidewall 128. The first sidewall 126 of the Germanium rib 114 is disposed above or adjacent to the first region 122 of the semiconductor substrate 108, and the second sidewall 128 is disposed above or adjacent to the second region 124 of the semiconductor substrate 108. The height ($h_{Ge}$) of the Germanium rib 114 may be determined by the selective epitaxy process and the etching process.

FIG. 3d shows that a first region 130 doped with atoms of a first conductivity type is formed on or within the first sidewall 126 of the Germanium rib 114, and a second region 132 doped with atoms of a second conductivity type is formed on or within the second sidewall 128 of the Germanium rib 114. In one embodiment, the first conductivity type is a p-conductivity type. The atoms of the first conductivity type may include boron ions. The second conductivity type is an n-conductivity type. The atoms of the second conductivity type may include phosphorous ions. The width ($w_{Ge}$) of the Germanium rib 114 may also be determined by the selective epitaxy process and the etching process.

FIG. 3e shows that silicon dioxide 308 is deposited above the semiconductor substrate 108 and the Germanium rib 114, and is etched to expose a portion 310 of the first region 122 of the semiconductor substrate 108 and a portion 312 of the second region 124 of the semiconductor substrate 108.

FIG. 3f shows that a conductive material 314 is deposited in the etched regions of the deposited silicon dioxide 308 to form electrodes 116, 118. The conductive material 314 may include aluminum. The etched regions of the deposited silicon dioxide 308 may be formed about 1 μm from the Germanium rib 114. Thus, the electrodes 116, 118 may also be formed about 1 μm from the Germanium rib 114 to reduce propagation loss when an optical signal propagates along the Germanium rib 114.

Figure 3G:
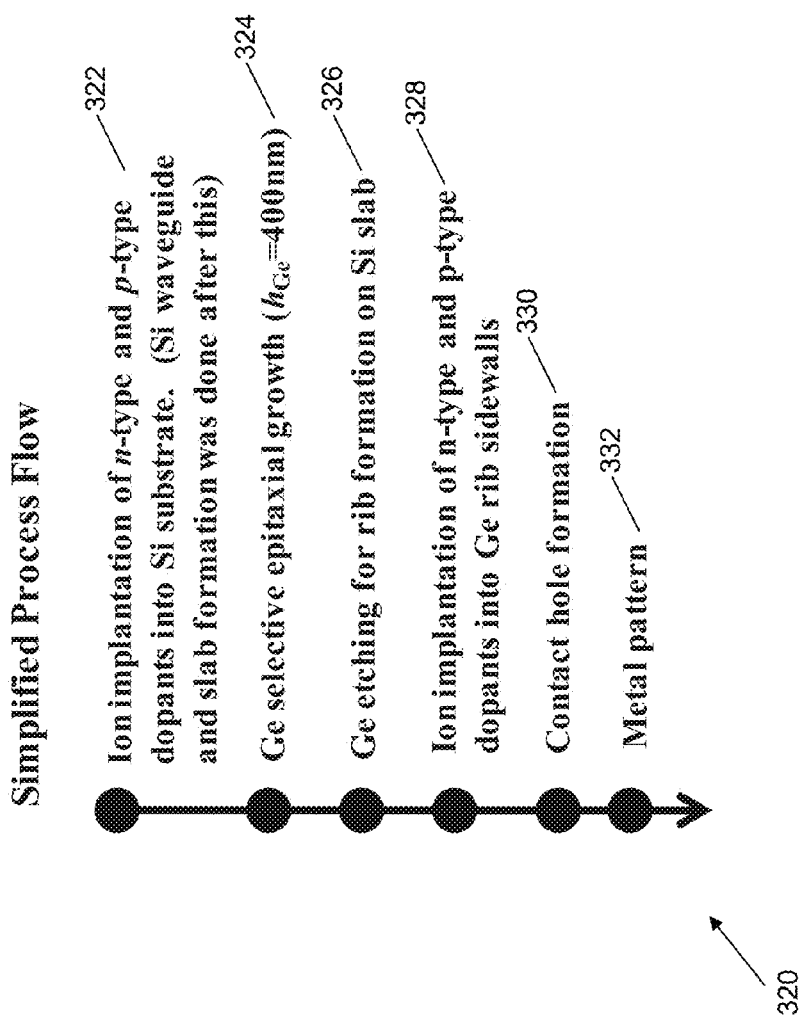
FIG. 3g shows a simplified process flow for manufacturing an optical modulator according to one embodiment of the present invention.

FIG. 3g shows a simplified process flow 320 of the process explained above with reference to FIGS. 3a to 3f. At 322, ion implantation of n-type and p-type dopants into a silicon substrate (e.g. substrate 109) is carried out. Silicon waveguide(s) (first and second waveguides 102, 104) and slab (e.g. semiconductor substrate 108) may be formed after the ion implantation. At 324, germanium selective epitaxy growth is carried out. The germanium layer may have a height ($h_{Ge}$) of 400 nm. At 326, germanium etching for rib formation on the silicon slab is carried out. At 328, ion implantation of n-type and p-type dopants into Germanium rib sidewalls is carried out. At 330, contact holes are formed. At 332, metal patterning is carried out.

The structure of the optical modulator 100 may be similar to a lateral p-i-n diode. The above described process is similar to that for a high performance waveguided germanium p-i-n photodetector, which can provide a feasible integration scheme for these two active photonic devices. The process can enhance the potential for realizing monolithically integrated high-speed and low power Germanium-based electro-absorption (EA) modulator with Germanium-based photodetector.

Figure 4:
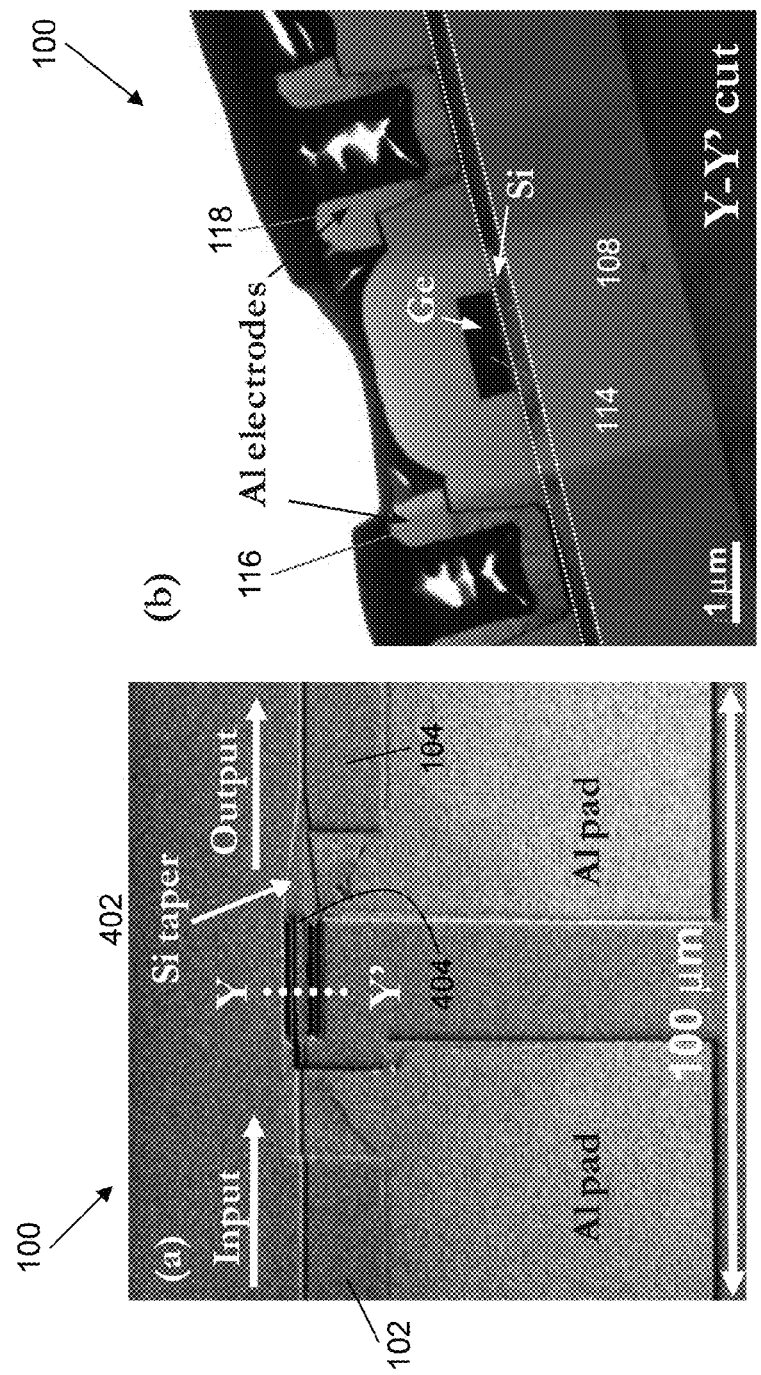
FIG. 4a shows a scanning electron microscopy (SEM) image of an optical modulator according to one embodiment of the present invention.
FIG. 4b shows a transmission electron microscopy (TEM) image of an optical modulator according to one embodiment of the present invention.

FIG. 4a shows a scanning electron microscope (SEM) image of an optical modulator 100. FIG. 4b shows a transmission electron microscope (TEM) image of the optical modulator 100 along the Y-Y' axis. In one embodiment, the optical modulator 100 may be a 20 μm long electro-absorption (EA) germanium (Ge) modulator. As shown in FIG. 4a, a 20 μm long silicon taper 402 is included at the end 404 of the modulator 100 before the output waveguide (e.g. the second waveguide 104).

Experiments are conducted to test the optical modulator 100. An optical measurement setup for conducting the experiments may use a Photonic Dispersion and Loss Analyzer (PDLA) with a Tunable Laser Source (TLS) module of a wavelength range of about 1495 nm to about 1640 nm as an optical input. Light may be coupled from the PDLA into and out of the optical modulator 100 using e.g. single-mode lens fibers. As the optical signal is coupled from the first waveguide 102 into the semiconductor substrate 108, it is evanescently-coupled up into the Germanium rib 114 because of a refractive index difference between the two mediums (e.g. between the semiconductor substrate 108 and the Germanium rib 114). The optical output from the modulator 100 is then fed back to the PDLA to measure the insertion loss at different reverse biases. Before the actual device (i.e. optical modulator 100) is measured, a normalization fibre-to-fibre measurement is conducted to capture the loss of the measurement system and test path. The insertion loss of the optical modulator 100 calculated by the PLDA is obtained through subtraction of the normalization loss.

Further, an electric field profile within the optical modulator 100 may be simulated using e.g. a MEDICI device simulator. The simulation may be done with a doping concentration of about $5 \times 10^{18}$ cm$^{-3}$ for p dopants in the first region 122 of the semiconductor substrate 108 and the first region 130 of the Germanium rib 114, and with a doping concentration of about $5 \times 10^{18}$ cm$^{-3}$ for n dopants in the second region 124 of the semiconductor substrate 108 and the second region 132 of the Germanium rib 114. A doping concentration of about $1 \times 10^{20}$ cm$^{-3}$ may be used below the electrodes 116, 118 for low contact resistance with the semiconductor substrate 108. The doping concentrations may be obtained from e.g. a TSUPREM process simulator based on the actual implant conditions. The desired dopant profiles may be achieved by tuning the ion implantation and annealing conditions for process optimization.

Figure 5:
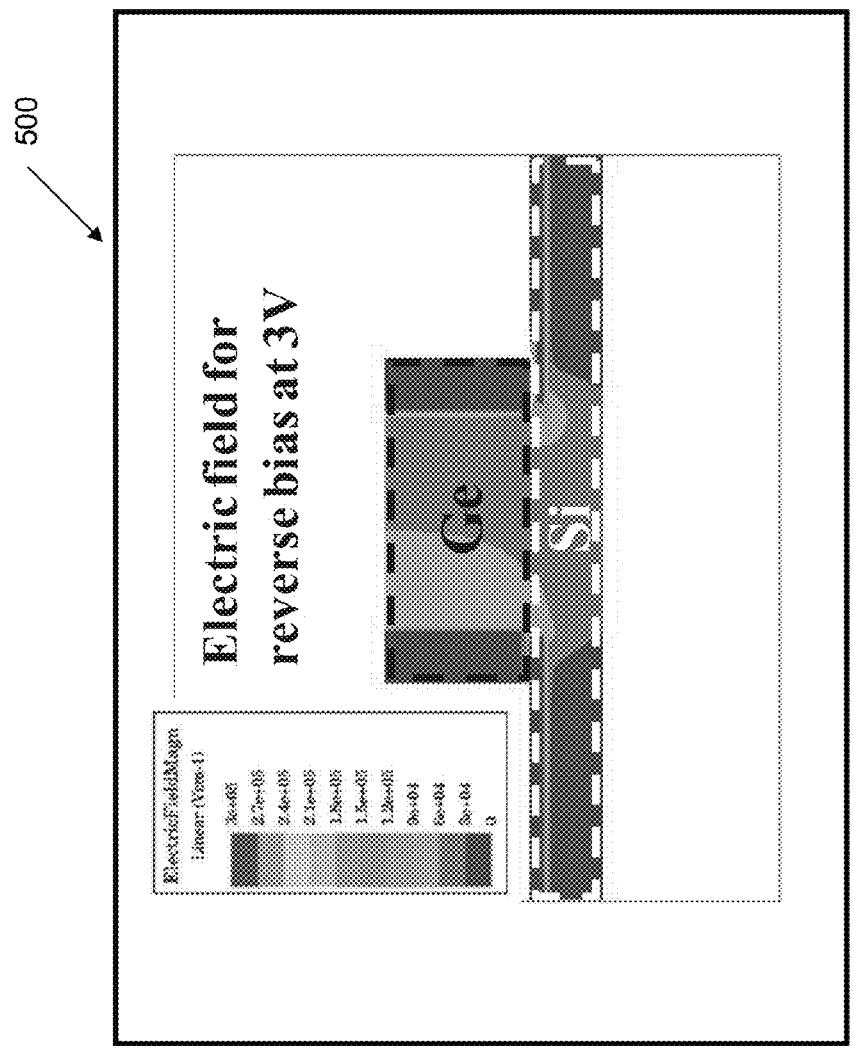
FIG. 5 shows a simulated electric field profile of an optical modulator according to one embodiment of the present invention.

FIG. 5 shows a simulated electric field profile 500 of the optical modulator 100. The simulated electric field profile 500 shows the electric field confinement within the Germanium rib 114 when the Germanium p-i-n diode (e.g. optical modulator 100) is reverse biased. In one embodiment, the Germanium rib 114 may have a width ($w_{Ge}$) of about 0.6 μm. The simulated electric field profile 500 may be obtained at a reverse bias of about 3 V and an electric field magnitude of about 50-60 kV/cm. An applied bias giving an electric field of about 100 kV/cm or higher should be avoided to prevent breakdown of the Germanium intrinsic region.

Figure 6:
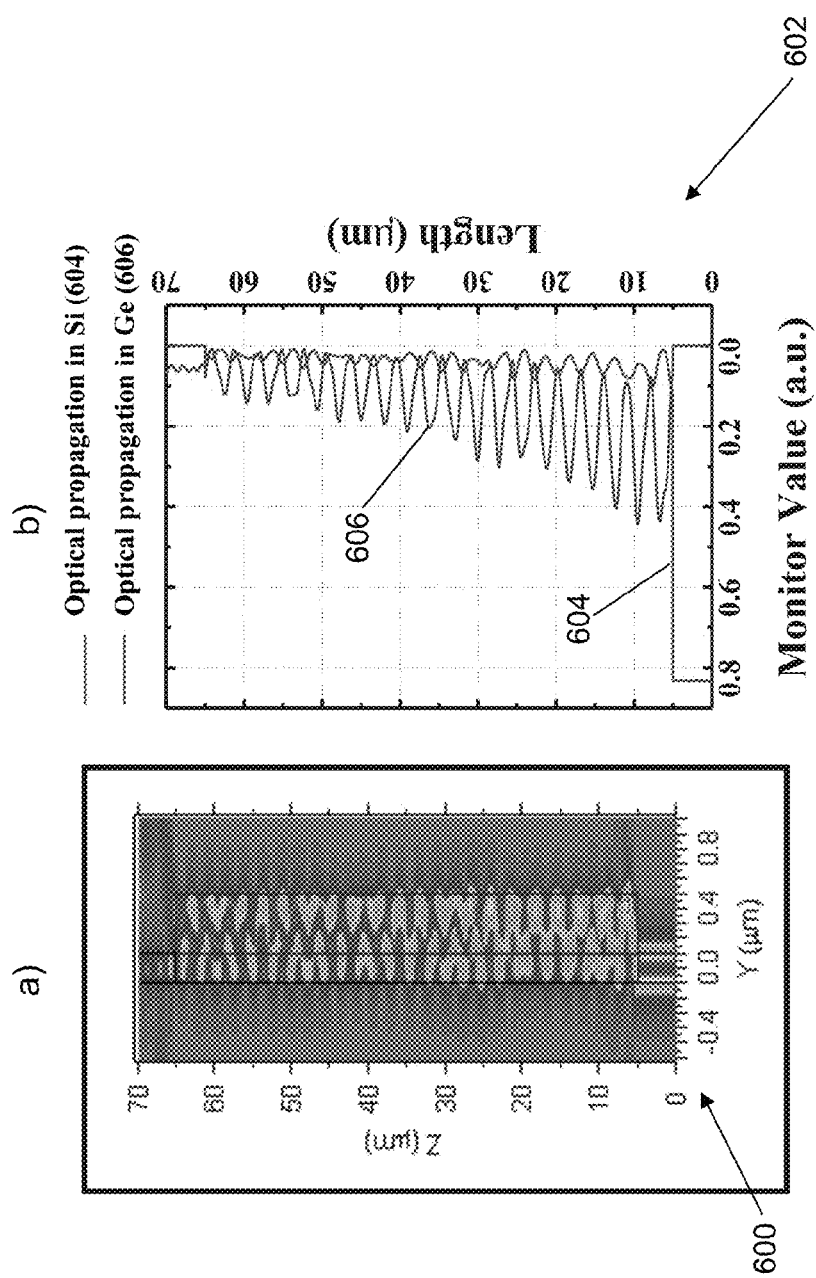
FIG. 6a shows a simulated profile of optical propagation within a Germanium rib of an optical modulator according to one embodiment of the present invention.
FIG. 6b shows a graph of optical propagation measurements plotted against a length of an optical modulator according to one embodiment of the present invention.

FIG. 6a shows a simulated profile 600 of optical propagation within the Germanium rib 114 of the optical modulator 100. FIG. 6b shows a graph 602 of optical propagation measurements [arbitrary units (a.u.)] plotted against the length of the optical modulator 100. Graph 602 shows a plot 604 of the propagation measurements (a.u.) in the semiconductor substrate 108. Graph 604 shows a plot 606 of the propagation measurements (a.u.) in the Germanium rib 114.

Direct bandgap absorption for bulk Germanium occurs for wavelengths less than 1550 nm, and the absorption coefficient drops significantly for wavelengths higher than 1550 nm. However, tensile strain present in the Germanium-on-Silicon grown layers results in bandgap shrinkage, and shifts the absorption edge by about 50 nm. The bandgap energy of intrinsic Germanium can further be decreased via the Frank-Keldysh effect by applying an electric field to enhance absorption for larger wavelengths.

The transmittance spectra of the optical modulator 100 are measured for a range of wavelengths at different reverse bias voltages. The transmittance may be measured with the Germanium rib 114 having a length ($L_{Ge}$) of 20 μm and a width ($w_{Ge}$) of 1 μm.

Figure 7:
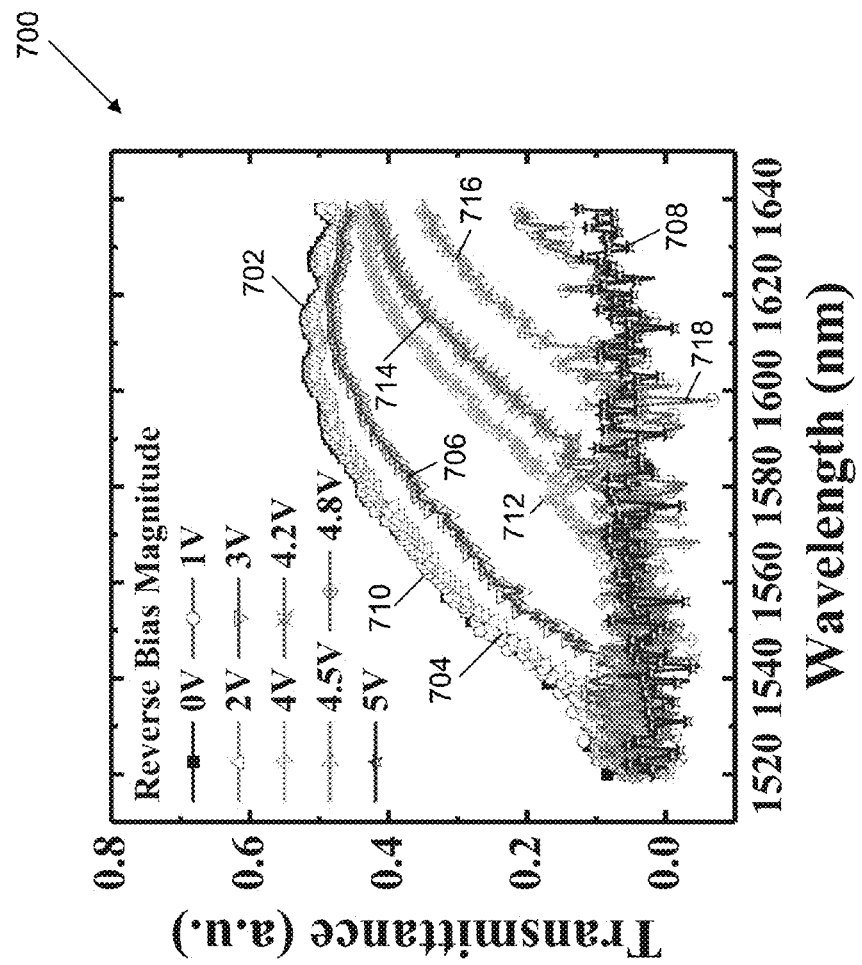
FIG. 7 shows a graph of measured transmittance plotted against wavelength of an optical signal for different reverse bias voltages according to one embodiment of the present invention.

FIG. 7 shows a graph 700 of the measured transmittance plotted against wavelength of an optical signal for different reverse bias voltages. At a reverse bias of 0 V (see plot 702), it can be observed that the transmittance slowly increases and saturates at wavelengths larger than 1600 nm. The transmittance is almost zero for wavelengths ranging from 1495 nm to 1520 nm (not shown in graph 700). At a reverse bias of up to 2 V (see plot 704), the change in transmittance of the optical signal was very small. In other words, the difference between the measured transmittance at a reverse bias of 0 V and the measured transmittance at a reverse bias of 2 V is very small. This may be caused by most of the applied voltage dropping across the electrodes 116, 118 and the semiconductor substrate 108 due to series resistance. Hence, the electric field across the optical modulator 100 may not be large enough to induce a significant Frank-Keldysh effect. When the reverse bias is increased to 3 V (see plot 706), there is an evident decrease in transmittance. This indicates that the modulation threshold voltage was about 2 V, and any voltage beyond 2 V contributed directly to the lateral electric field in the optical modulator 100. From graph 700, it can be observed that a reverse bias voltage of 5 V (see plot 708) is sufficient to reduce the transmittance to zero. Thus, the optical modulator may not operate (e.g. in OFF mode) at 5 V.

Graph 700 also shows plots 710, 712, 714, 716, 718 of the measured transmittance plotted against the wavelength of the optical signal at 1 V, 4 V, 4.2 V, 4.5 V and 4.8 V respectively.

An extinction ratio (ER) is calculated using the following equation:

$$ER = IL(0) - IL(V),$$

where IL(0) and IL(V) are the insertion loss in decibel (dB) at zero bias and a reverse bias of V, respectively.

The extinction ratio for the range of wavelengths from 1520 to 1640 nm can be extracted at different reverse bias voltages using the above equation.

Figure 8A:
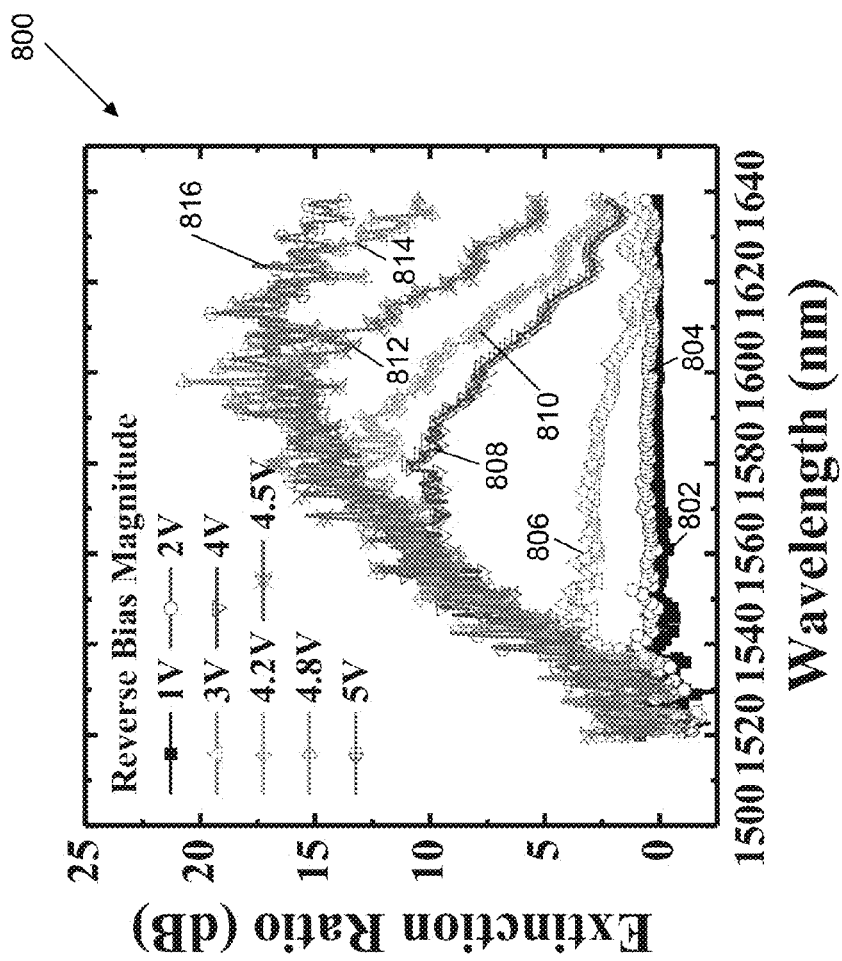
FIG. 8a shows a graph of extinction ratio plotted against wavelength of an optical signal for different reverse bias voltages according to one embodiment of the present invention.

FIG. 8a shows a graph 800 of extinction ratio plotted against wavelength for different bias voltages. Graph 800 shows plots 802, 804, 806, 808, 812, 814, 816 of extinction ratio plotted against wavelength for 1 V, 2 V, 3 V, 4 V, 4.2 V, 4.5 V, 4.8 V and 5 V respectively. For a reverse bias of 4.5 V or more (see plots 812, 814, 816), the extinction ratio is about 15 dB at a wavelength of 1600 nm.

Figure 8B:
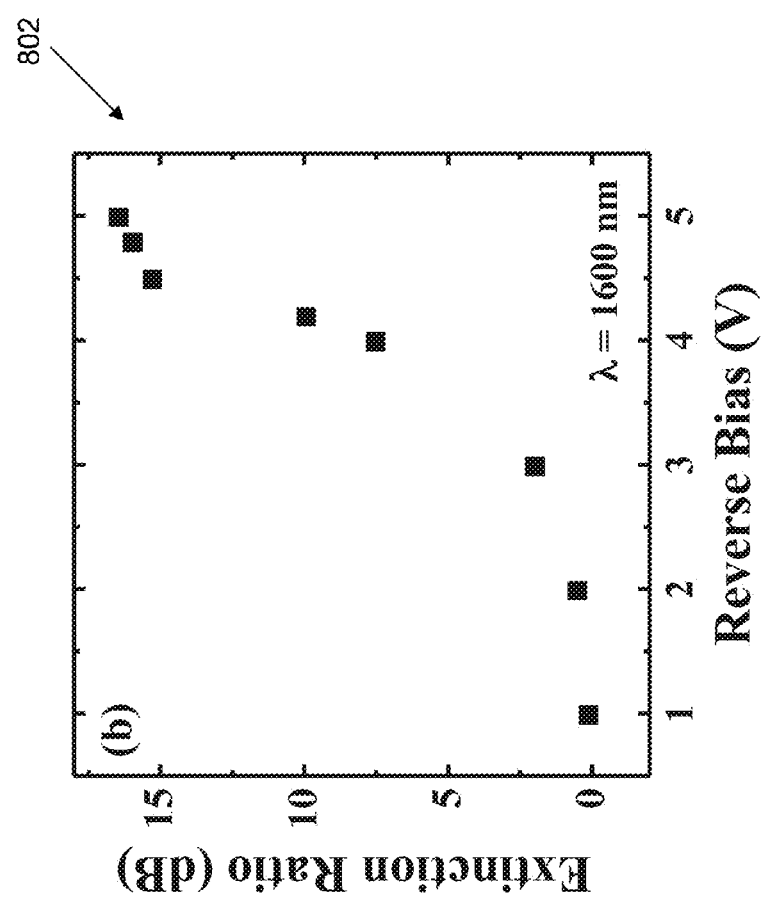
FIG. 8b shows a graph of extinction ratio plotted against reverse bias voltage for a wavelength of 1600 nm according to one embodiment of the present invention.

FIG. 8b shows a graph 802 of extinction ratio plotted against reverse bias voltage for a wavelength of 1600 nm. It can be observed that a dynamic voltage swing of less than 3 V is required to achieve an extinction ratio of about 15 dB.

Figure 9:
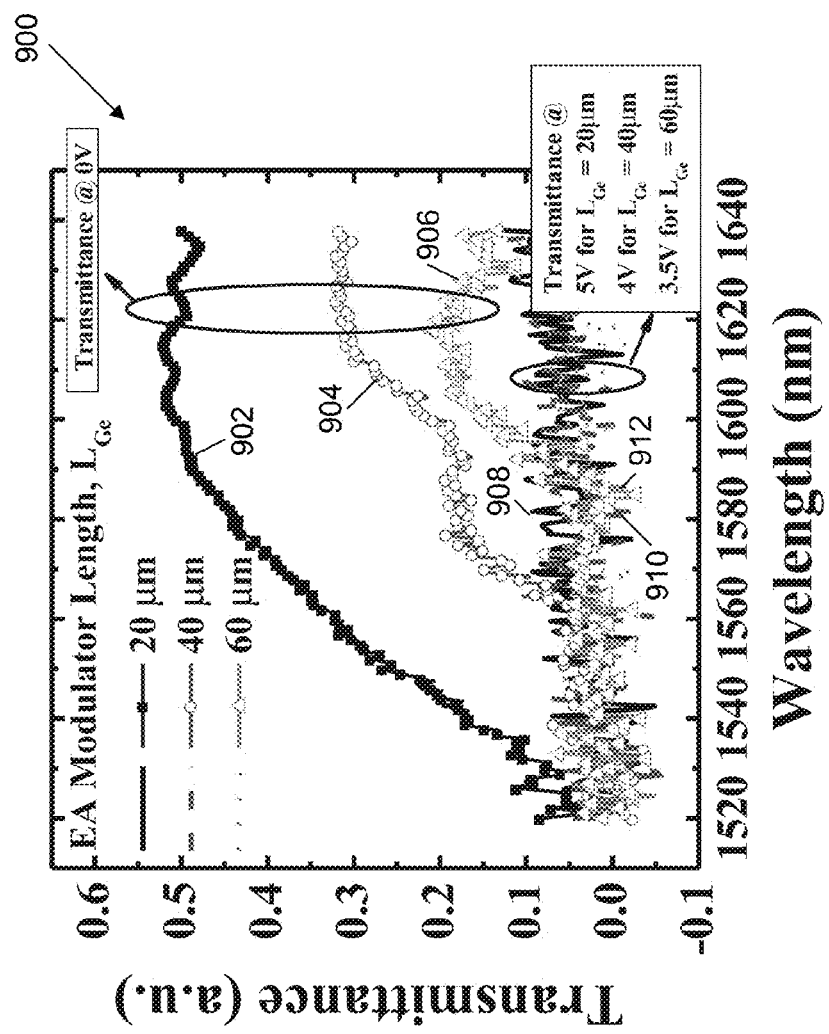
FIG. 9 shows a graph of transmittance plotted against wavelength of an optical signal for different lengths of a Germanium rib of an optical modulator according to one embodiment of the present invention.

FIG. 9 shows a graph 900 of transmittance plotted against wavelength for different lengths ($L_{Ge}$) of the Germanium rib 114 of the optical modulator 100. Graph 900 shows plots 902, 904, 906 of transmittance plotted against wavelength for $L_{Ge}$ of 20 µm, 40 µm and 60 µm respectively at 0 V.

The width ($w_{Ge}$) of the Germanium rib 114 may be 1 µm. A decrease in transmittance can be observed as the length ($L_{Ge}$) increases from 20 µm to 60 µm. Looking at wavelengths larger than 1600 nm, the propagation loss from Germanium absorption is estimated to be about 6-7 dB per 20 µm increase in length.

Graph 900 also shows a plot 908 of transmittance plotted against wavelength for $L_{Ge}$ of 20 µm at 5 V, a plot 910 of transmittance plotted against wavelength for $L_{Ge}$ of 40 µm at 4 V, and a plot 912 of transmittance plotted against wavelength for $L_{Ge}$ of 60 µm at 3.5 V.

Figure 10:
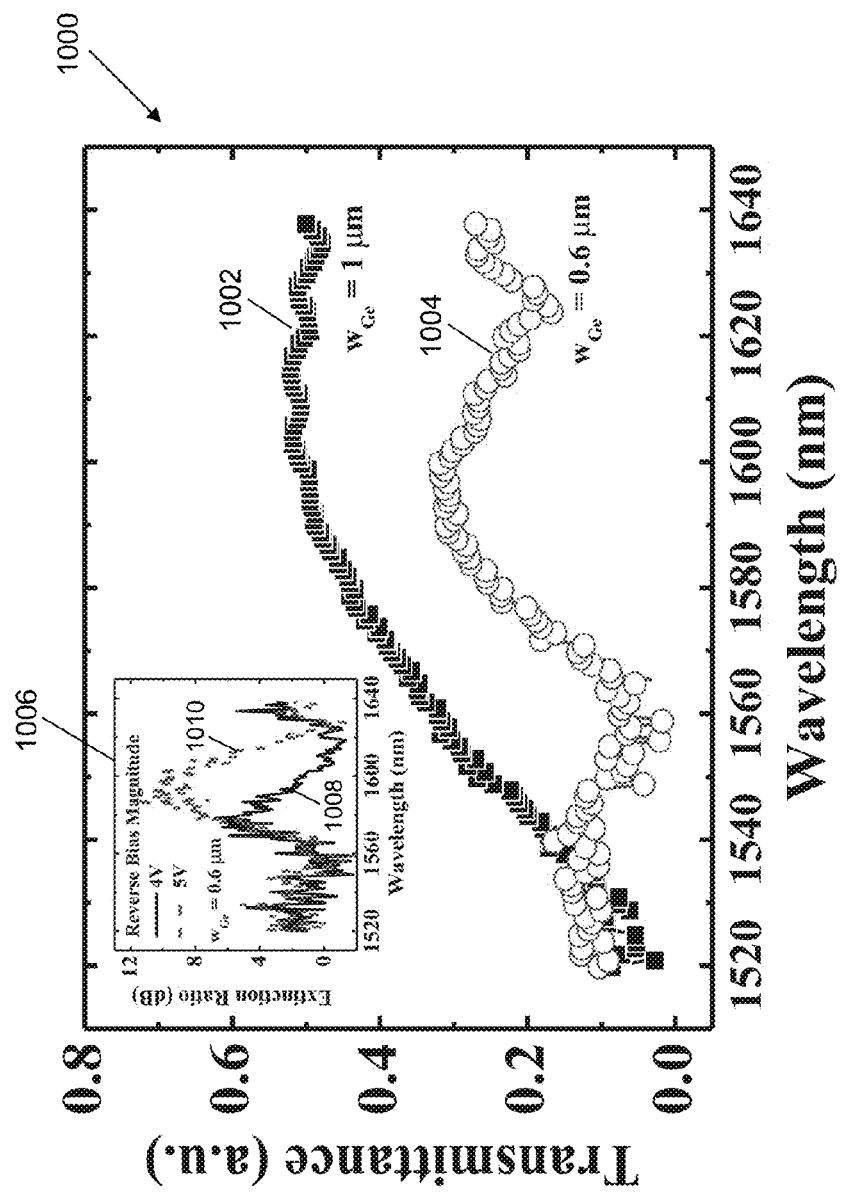
FIG. 10 shows a graph of transmittance plotted against wavelength of an optical signal for different widths of a Germanium rib of an optical modulator according to one embodiment of the present invention.

FIG. 10 shows a plot 1002 of transmittance plotted against wavelength for a Germanium rib width ($w_{Ge}$) of 0.6 µm, and a plot 1004 of transmittance plotted against wavelength for a Germanium rib width ($w_{Ge}$) of 1 µm. The length ($L_{Ge}$) of the Germanium rib 114 may be 20 µm. It can be observed that the transmittance is lower for an optical modulator with a smaller width ($w_{Ge}$). A possible reason may be additional scattering due to inefficient coupling of light into and out of the Germanium rib 114 from the waveguides 102, 104 for a width ($w_{Ge}$) of 0.6 µm. Hence, device dimensions may be adjusted to optimize the optical modulator structure.

FIG. 10 also shows an inset graph 1006. The inset graph 1006 shows a plot 1008 of extinction ratio plotted against wavelength at a reverse bias voltage of 4 V and a plot 1010 of extinction ratio plotted against wavelength at a reverse bias voltage of 5 V. The width ($w_{Ge}$) of the Germanium rib 114 is 0.6 µm. It can be observed from the inset graph 1006 that modulation is also achieved for the optical modulator with a Germanium rib width ($w_{Ge}$) of 0.6 µm.

In one embodiment, the insertion loss for the optical modulator 100 is approximately −20 dB at 1600 nm for a length ($L_{Ge}$) of 20 µm. By subtracting the loss due to fiber-to-waveguide coupling (about 2.5 dB/facet) and Germanium absorption (about 6 dB), the coupling loss between the waveguide (e.g. second waveguide 104) and the optical modulator 100 is estimated to be about 9 dB. The insertion loss can be improved through design optimization such as forming tapers at the input and output ends of the Germanium rib 114, and eliminating the taper 402 for better confinement of the optical mode from the waveguide 102, 104 to the Germanium rib 114 and vice versa.

Figure 11:
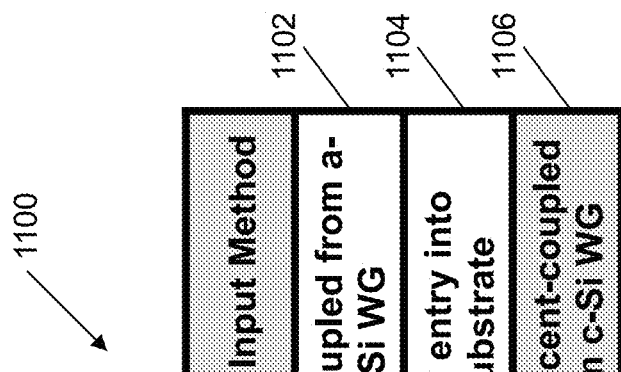
FIG. 11 shows a table listing information of two conventional optical modulators and an optical modulator according to one embodiment of the present invention.

FIG. 11 shows a table 1100 listing the information of two conventional optical modulators and the above described optical modulator 100. Line 1102 of the table 1100 shows the information of a first conventional optical modulator [1]. Line 1104 of the table 1104 shows the information of a second conventional optical modulator [2]. Line 1106 shows the information of the optical modulator 100.

In comparison with the two conventional optical modulators, the optical modulator 100 according to various embodiments requires a smaller active area (smaller footprint on-chip). Also, the optical modulator 100 has a better performance over the two conventional optical modulators in terms of modulation (i.e. extinction ratio). A peak extinction ratio of about 15 dB at 1600 nm can be achieved for a 3 V or less (e.g. 2.5 V) dynamic voltage swing for the optical modulator 100.

The above described optical modulator 100 (e.g. modulator electro-absorption (EA) modulator) have advantages over the known silicon Mach-Zehnder interferometer (MZI) modulator by having lower energy consumption, a smaller footprint on-chip, and a potentially higher modulation speed. These factors are important for efficient encoding of optical signals in silicon photonics circuits. Furthermore, using Group IV-based (i.e. silicon- or germanium-based) in the optical modulator 100 allows compatibility with standard complementary metal-oxide-semiconductor (CMOS) processing.

A lateral electric field is employed in the Germanium rib 114 of the optical modulator 100 to enhance absorption via the Frank-Keldysh effect. This may shift the absorption edge with an applied bias for wavelengths beyond 1600 nm. Further, a monolithic integration of waveguided Germanium-based modulator and photodetector can be simplified with the structure of the optical modulator 100. As such, the optical modulator 100 may provide a low power and high speed Germanium-based EA modulator viable for future silicon photonics applications.

While embodiments of the invention have been particularly shown and described with reference to specific embodiments, it should be understood by those skilled in the art that various changes in form and detail may be made therein without departing from the spirit and scope of the invention as defined by the appended claims.

The scope of the invention is thus indicated by the appended claims and all changes which come within the meaning and range of equivalency of the claims are therefore intended to be embraced.

In this document, the following documents are cited:

[1] US Patent Publication No 2007/0116398

[2] U.S. Pat. No. 7,599,593

What is claimed is:

1. An optical modulator, comprising:
   a first waveguide,
   a second waveguide,
   a modulating portion connected between the first waveguide and the second waveguide, the modulating portion being configured to receive an input signal from the first waveguide, to modulate the input signal and to supply a corresponding modulated input signal as an output signal to the second waveguide,
   wherein the modulating portion comprises:
      a semiconductor substrate, one end thereof being coupled to the first waveguide, and a corresponding opposite end thereof being coupled to the second waveguide,
      a Germanium rib provided on the semiconductor substrate such that the input signal propagates through the Germanium rib along a longitudinal axis thereof, and
      a first electrode and a second electrode respectively provided on the semiconductor substrate, wherein the Germanium rib is provided between the first electrode and the second electrode, and wherein the first electrode and the second electrode are configured to apply an electrical field to the Germanium rib in order to modulate the input signal propagating through the Germanium rib;
      wherein the semiconductor substrate comprises silicon.

2. The optical modulator of claim 1, wherein the first waveguide comprises a tapered portion being coupled to the one end of the semiconductor substrate to couple the optical signal from the first waveguide into the modulating portion.

3. The optical modulator of claim 1, wherein the second waveguide comprises a tapered portion being coupled to the other end of the semiconductor substrate to couple the modulated optical signal from the modulating portion into the second waveguide.

4. The optical modulator of claim 1, wherein the semiconductor substrate further comprises a first region doped with atoms of a first conductivity type and a second region doped with atoms of a second conductivity type, the first region being formed below or adjacent to a first sidewall of the Germanium rib, and the second region being formed below or adjacent to a second sidewall of the Germanium rib.

5. The optical modulator of claim 4, wherein the first electrode is disposed above the first region of the semiconductor substrate and the second electrode is disposed above the second region of the semiconductor substrate.

6. The optical modulator of claim 4, wherein the Germanium rib comprises a first region doped with atoms of the first conductivity type and a second region doped with atoms of the second conductivity type, the first and second regions being formed on or within the first and second sidewalls of the Germanium rib, respectively.

7. The optical modulator of claim 6, wherein the first region of the Germanium rib is disposed above the first region of the semiconductor substrate and the second region of the Germanium rib is disposed above the second region of the semiconductor substrate.

8. The optical modulator of claim 4, wherein the first conductivity type is a p-conductivity type.

9. The optical modulator of claim 4, wherein the atoms of the first conductivity type comprise boron ions.

10. The optical modulator of claim 4, wherein the second conductivity type is a n-conductivity type.

11. The optical modulator of claim 4, wherein the atoms of the second conductivity type comprise phosphorous ions.

12. The optical modulator of claim 7, wherein the electrode and the further electrode comprise aluminum.

13. The optical modulator of claim 1, wherein the first waveguide, the second waveguide and the semiconductor substrate are formed monolithically from a same substrate.

14. The optical modulator of claim 1, wherein the first waveguide, the second waveguide and the semiconductor substrate are disposed above a buried oxide layer.

15. A method for manufacturing an optical modulator according to claim 1, the method comprising:
   depositing a germanium layer above a semiconductor substrate; and
   etching the deposited germanium layer to form a Germanium rib having a first sidewall and a second sidewall;
   wherein the semiconductor substrate comprises silicon.

16. The method according to claim 15, comprising:
   forming a first region doped with atoms of a first conductivity type and a second region doped with atoms of a second conductivity type on the semiconductor substrate before forming the Germanium rib, wherein the formation of the Germanium rib and the formation of the first region and the second region are carried out such that the first sidewall of the Germanium rib is disposed above or adjacent to the first region of the semiconductor substrate, and that the second sidewall is disposed above or adjacent to the second region of the semiconductor substrate.

17. The method of claim 15, further comprising etching a substrate to form a first waveguide, a second waveguide and the semiconductor substrate having one end coupled to the first waveguide and a corresponding opposite end coupled to the second waveguide.

18. The method of claim 15, wherein the germanium layer is deposited above the semiconductor substrate by a selective epitaxy process.

19. The method of claim 15, further comprising forming a first region doped with atoms of a first conductivity type and a second region doped with atoms of a second conductivity type on or within the first and second sidewalls of the Germanium rib, respectively.

20. The method claim 15, further comprising:
   depositing silicon dioxide above the semiconductor substrate and the Germanium rib;
   etching the deposited silicon dioxide to expose a portion of the first region of the semiconductor substrate and a portion of the second region of the semiconductor substrate;
   depositing a conductive material in the etched regions of the deposited silicon dioxide to form electrodes.

* * * * *